INVENTOR.
Claus W. Hartmann
BY
Watson, Cole, Grindle & Watson
Attys.

United States Patent Office 3,557,526
Patented Jan. 26, 1971

3,557,526
PACKAGING DEVICE FOR PACKING OBJECTS
IN TUBULAR CASINGS
Claus Wolfgang Hartmann, 98 Reichertshalde,
7410 Ludwigsburg, Germany
Filed Aug. 4, 1969, Ser. No. 847,036
Claims priority, application Germany, Aug. 9, 1968,
6,752,577
Int. Cl. B65b 43/26
U.S. Cl. 53—183          11 Claims

ABSTRACT OF THE DISCLOSURE

An automatic packaging device for packing objects in tubular casings. The device withdraws and cuts off a length of tube from a stock and one end of the tube is closed. The tube is then moved and slipped over an object whereafter the other end is closed and the completed package discharged.

The invention concerns a package device for packing an object in a tubular case which can be closed at its ends. "Object" means any object which has to be packed in a tubular case. Rod shaped bodies, for example rolls of tracing paper, pieces of pipe, rods, long loaves of bread and the like are particularly suitable for packing.

The object of the invention is the automatic packing of objects of the kind described above.

This object is achieved according to the invention which provides a device for packing an object in a tubular case, said device comprising a stock roller means for withdrawing a tube from said stock roller, means for cutting a predetermined length of tube from the tube drawn from the stock roller, first welding means for closing one end of the length of tube, conveyor means for moving the length of tube a distance corresponding to its length, opening means for opening said other end of the length of tube, means for slipping the length of tube over an object and second welding means for closing said other end of the length of tube. The device carries out all the operations which are necessary for packing an object, the tubular case being taken automatically from a stock and the object to be packed only having to be placed on the device and being thrown off the device in the packed state.

The device according to the invention makes possible completely automatic operation of great efficiency and of simple construction. The individual parts of the device are readily accessible and can be adjusted to the length of each object to be packed.

In a preferred embodiment of the invention the cutting means and the first welding means are combined to form one unit and arranged to be adjusted in the direction in which the tube is conveyed. Downstream of the welding device in the direction of conveyance a barrier, preferably a light barrier is provided. Thus the combined parts may be adjusted in the direction of conveyance of the tubular case in accordance with the length thereof, the forward travel in each case being determined by the barrier. The tubular case is cut off the stock by means of the cutting means in an advantageous manner. The first welding means serves to close the end of the tubular case simultaneously with the cutting process.

In a preferred embodiment of the invention the means for slipping the length of tube over an object has a guide member which includes a double-armed lamellae, pivotably arranged on a ring. The lamellae are urged together by a spring to form at least in the closed state, a cone whose point in the reception position is directed towards the means for withdrawing a length of tube. A ring displaceable in the longitudinal direction of the lamellae serves to alter the angular position taken up by the lamellae in relation to the central axis of the ring.

The slipping means preferably includes a traversing device, which has an endless chain arranged parallel to the original direction of conveyance and having conveyor plates movable transversely thereto. A stop displaceable in the original direction of conveyance is preferably provided at the end of the traversing device remote from the stock.

The traversing device serves for the reception of the objects to be packed, and for the conveyance thereof to the packing station where they are prevented by the stop from moving while the tubular case is being slipped thereover. The traversing device also conveys the packed object to a station for closing its open end and finally discharges the packed object from the device.

Preferably the welding means has two clamping jaws and two welding jaws removable from one another, of which the clamping jaws are provided on their mutually adjacent sides with a resilient cover. The means for opening the other end of the length of tube preferably comprises a pair of spreading and air-evacuating nozzles, adapted to be moved apart and brought together again laterally. This pair of nozzles spreads the open end of the tubular case and evacuates the case before the case is closed by welding after prior fixing of the spread end by the clamping jaws.

A specific embodiment of the invention will now be described by way of example with reference to the accompanying drawings, in which.

Figure 2:
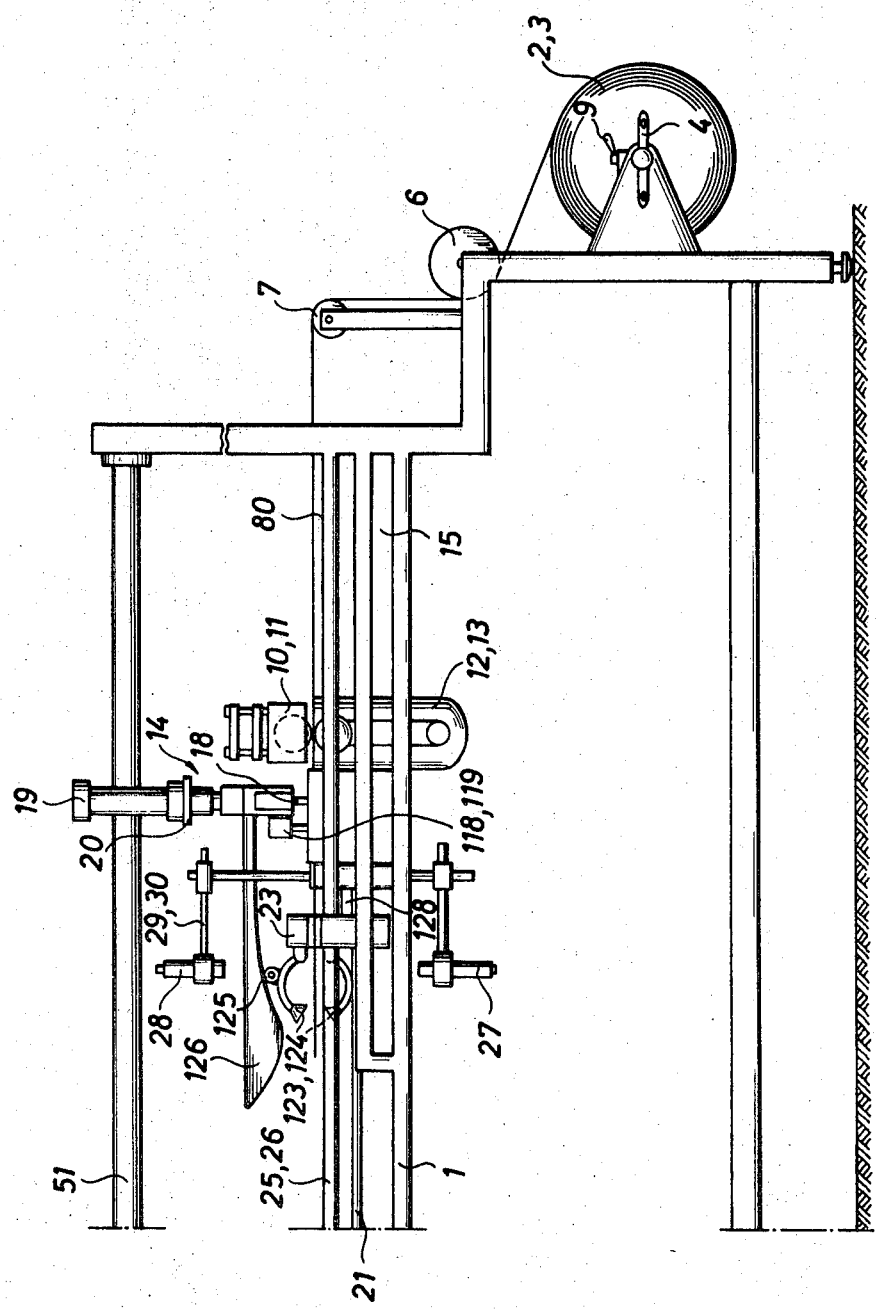
Figure 4:
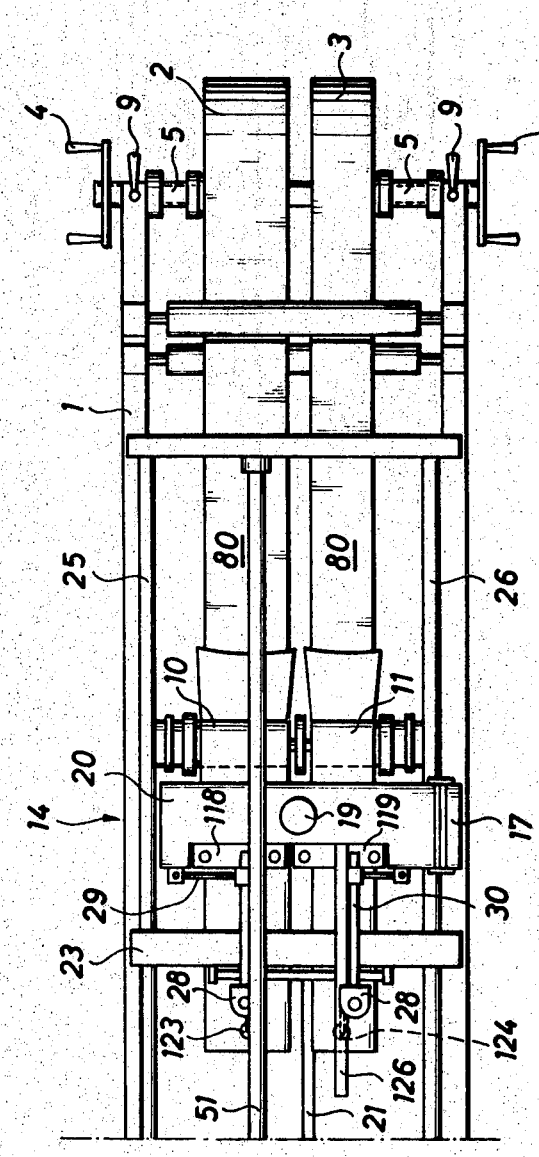

In the following description the connotations left hand and right hand relate to the views shown in the drawings. Two stock rollers 2 and 3 are rotatably mounted (FIGS. 2 and 4) on the right hand foot end of the right hand frame part 1, which serve to receive a thin-walled black plastic tube. For the exchange of one of the stock rollers 2 and 4 in each case a threaded pin 5 is provided which carries a hand operable crank 4 on its end adjacent the stock roller 2 or 3, and is displaceable thereby. The stock rollers 2 and 3 are braked in a known manner, for example a brake band, whereby arbitrary rotation of the stock rollers 2 or 3 is prevented. The rotational position of the threaded pin 5 is secured by a cross-bar 9.

Two guide rollers 6 and 7 are mounted on the frame part 1 downstream of both stock rollers 2 and 3. Two pairs of conveyor rollers 10 and 11 are arranged on the frame 1 each of which is drivable by a motor 12 or 13 arranged therebelow. A cutting and welding device 14 is disposed adjacent the pair of conveyor rollers 10 and 11, the said cutting and welding device and the pair of conveyor rollers 10 and 11 combined therewith being adjustable on the frame part 1. A handle 17 is located on the upper part of the device to lift the upper part from the lower part by pivoting movement. A working cylinder 19, which is secured by its cylinder housing to a flange 20 on the frame serves to raise and lower a cutting knife 18 and a pair of welding jaws 118, 119 connected thereto.

Two light barriers consisting in each case of a source of light 27 and a selenium cell 28 are linked to the cutting device 14 by means of stands 29 and 30. The pair of conveyor rollers 10, 11 as well as the cutting and welding device together with the light barriers 27 and 28 arranged thereon form one unit adjustable on the lower frame 1 by virtue of a cut-out 15 in the frame part 1 corresponding to the length of the tubular case to be produced and secured there by means, not shown, such as screws.

Figure 1:
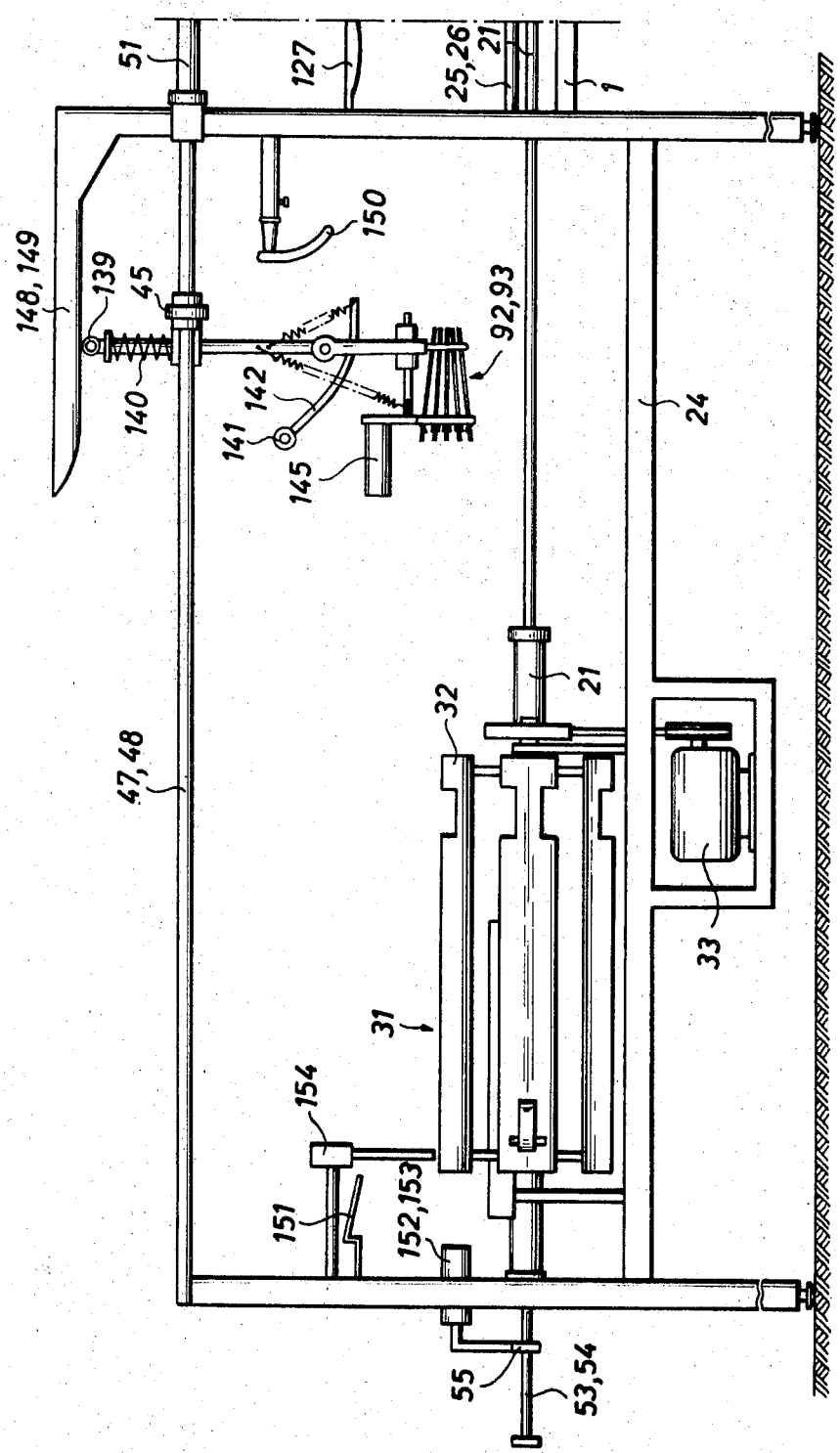
FIGS. 1 and 2 are in each case a side elevation of the right and left hand parts of a device for packing a roll of printing or dyeline paper.
Figure 3:
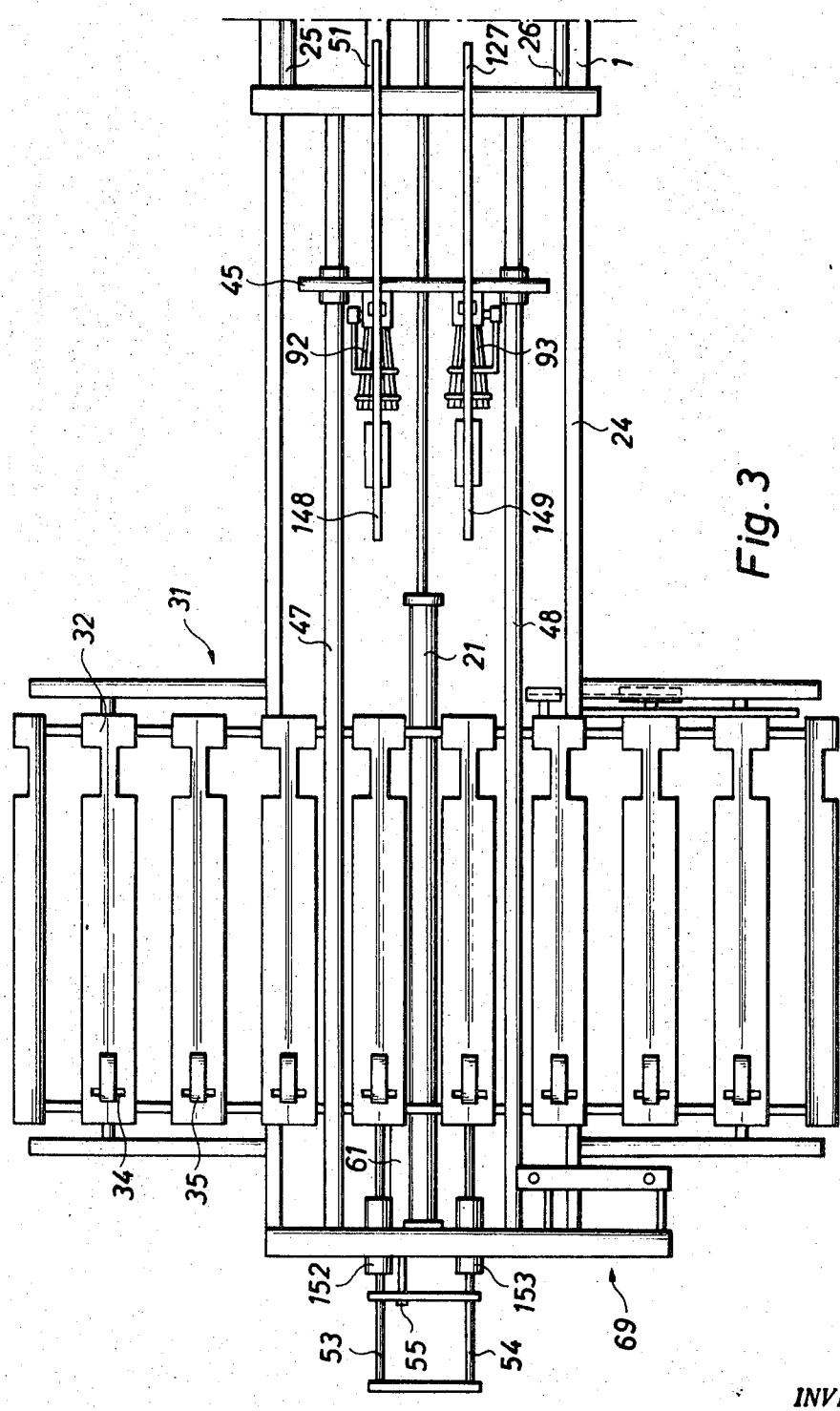
FIGS. 3 and 4 are in each case a top plan view on the right and left hand parts of the device of FIG. 1.

Two guide bars 25 and 26 are provided laterally of the frame part 1 on which a cross-bar 23 is displaceably mounted. For displacing the cross-bar a working cylinder 21 is utilised (FIGS. 1 and 3). Two magnetically operated first clamps (not shown) each having at least one jaw adapted to be raised or lowered are provided on the cross-bar 23 to catch hold of a tube 80 fed by the pair of conveyor rollers 10 or 11 through the cutting and welding device 14. In addition two pairs of suction clamps 123 and 124 are pivotally mounted on the cross-bar 23. Each suction clamp is surrounded at its mouth with a thin washer of resilient material, for example rubber.

A spring (not shown) is provided for holding the suction clamps apart. A support roller 125 is mounted on the upper suction clamp which co-operates with a curved rail 126 mounted on part 20 of the frame and a curved rail 127 mounted on a middle part 24 of the frame for the multiple mutual movement of the two clamps of a pair, both pairs being operated simultaneously. The cross-bar 23 is urgeable against a stop 128, mounted on the cutting and welding device, by means of the work cylinder 21.

A transverse conveyor device 31 is provided on the central part 24 of the frame, which has conveyor plates 32 mutually connected by means of a pair of chains. The conveyor plates 32 are adapted to be driven stepwise by means of a motor 33. On their side facing the stock rollers 2, 3 the plates have lateral slots and on the side remote from the stock rollers a slot 34 is arranged at right angles to the longitudinal axis of each plate. Each slot 34 is partially covered by leaf springs 35 arranged thereabove.

The slots 34 serve for the engagement of a feeler comprised in a reception switch (not shown) which is operated when a roll of printing (or dyeline) paper is laid in a conveyor plate 32, thereby holding down the leaf spring 35.

Figure 6:
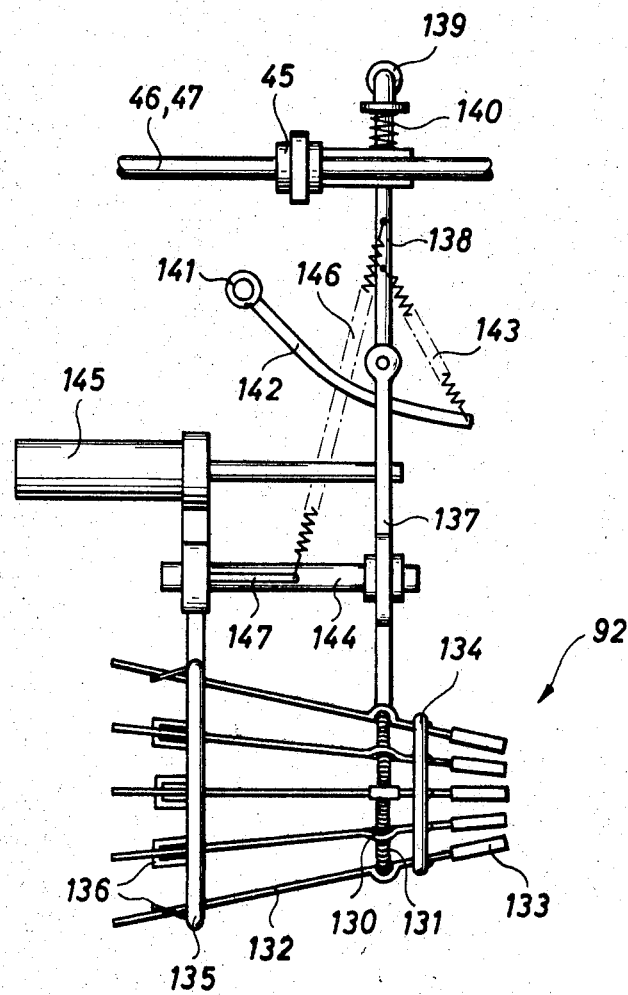
FIG. 6 is a position of FIG. 1 on a larger scale.

A cross-bar 45 is mounted on two guide bars 47 and 48 and on part 24 of the frame and is displaceable by means of a working cylinder 51 mounted on the right hand frame part. The cross-bar carries two guide members 92 and 93, of which only the guide member 92 will be described below in detail (FIG. 6). Double armed lamellae 132 are pivotally mounted on a ring 130 and held apart by coil springs 131. Eight lamellae are arranged on the ring 130, on whose ends, adjacent the clamp, resilient tubular pieces 133 are forced. An annular spring 134 is also arranged on this end which urges together the ends, fitted with the tubular pieces 133. A slide ring 135, which carries guide member 136 for the lamellae 132 is disposed on the side remote from the tubular pieces 133.

The ring 130 is mounted on a pivotal lever 137, which is pivotally mounted on a lifting bar 138. The bar 138 is adapted to slide vertically in the cross-bar 45 and carries an application roller 139 on its end projecting thereabove. A spring 140 is disposed between this roller and the cross-bar 45, for urging bar 138 upwardly. A stop member 142 carrying a roller 141 is mounted on the pivotal lever 137. The end of the stop member 142 remote from the roller is connected by means of a spring 143 to the lifting bar 138.

The pivotal lever 137 carries a guide peg 144, on which a cylindrical cover of a work cylinder 145 is also displaceably mounted whose piston rod is secured to the pivotal lever 137. A spring 146, weaker than the spring 143, connects the lifting bar 135 to a pin 147 mounted on the cylindrical cover of the work cylinder 145. The springs 143 and 146 are so designed and the pivotal lever 137 co-operates in such a manner with stops mounted on the lifting bar 138 that the pivotal lever can adopt either a vertical (FIG. 6) or a horizontal position.

A stop rail 148 and 149 (FIG. 1) is provided above each of the application rollers 139, which serves to lower the guide member 92 or 93 when it is located in its right hand position. On the right hand side of the part 24 of the frame an adjustable stop member 150 is provided to pivot respectively the guide member 92 or 93, which brings the guide members 92, 93 into the position shown in FIG. 1. On the left hand side of the part 24 of the frame a stop spring 151 is provided which brings the guide member 92 or 93 into a position wherein its longitudinal axis lies vertical and the pivotal lever 137 horizontal.

Two guide rods 53 and 54 are provided on the left hand side of the part 24 of the frame on which a cross-bar 55 may be displaced by means of a working cylinder 61. The cross-bar carries two stop members 152 and 153, which are located in the direction of conveyance of the tube 80, behind the traversing device 31 and can be displaced horizontally.

Figure 5:
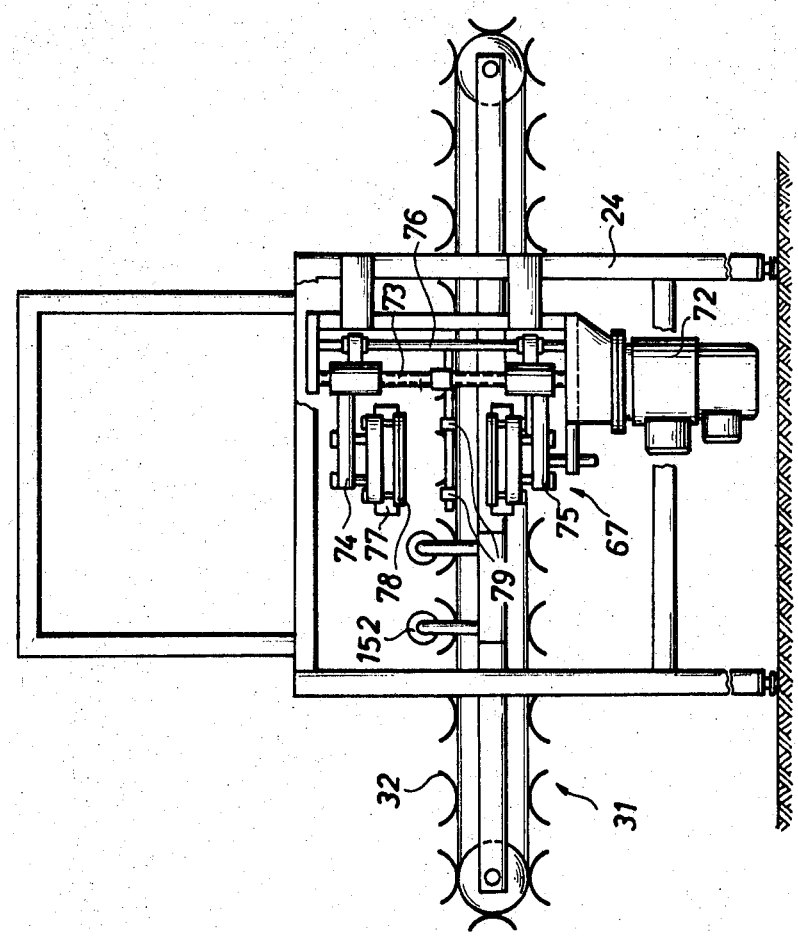
FIG. 5 is an end elevation of the left hand part of the device seen in the direction of the arrow A in FIG. 1 with certain parts omitted.

A locking device 67 (FIG. 3) is provided on the left hand front side of the part 24 of the frame. The device has a reversible motor 72 (FIG. 5) which drives a vertical spindle 73 with opposed threads. On each of the two threaded sections a carrier 74 and 75 is provided mounted on the threaded spindle by its threaded sleeve, through which a guide bar 76, arranged axially parallel to the spindle 73, passes. Each carrier has a welding jaw 77 and a sealing jaw 78. The sealing jaws are mounted on the sides of the welding jaws 77 remote from the stock rollers 2, 3 and each have on their adjacent sides a resilient cover, which may be made of foam rubber.

A pair of nozzles 79 is mounted for horizontal displacement in the middle between the welding jaws 77 and the sealing jaws 78 but without their movement tracks, which is displaceable by means of a working cylinder longitudinally of the part 24 of the frame and with its individual nozzles in turn vertical thereto. The pair of nozzles is to be attached to a source of low pressure fluid.

Tubes of different diameters may be provided on the stock rollers 2 and 3.

The description of the operation of the device will start from the packing of a roll of printing (or dyeline) paper in a black casing of plastic material impervious to light, which is unrolled from the stock roller 2. For this the tube is drawn from the stock roller 2 by the pair of conveyor rollers 10 having a type of funnel-shaped guide and passed through the cutting and welding device 14 as well as through the first pair 123 of clamps mounted on the cross-bar 23. On the appearance of the front end of the tube at the light barrier 27, 28, the motor 12 associated with the pair 10 of conveyor rollers will be stopped. The front end of the tube has then reached the pair 123 of suction clamps. The front end of the piece of tube is conveyed in the direction of the part 24 of the frame by means of the work cylinder 21. During this movement the pair 123 of suction clamps closes and opens several times, generally three times, under the action of the curved rails 126 and 127, whereby the tube will be opened with safety for the introduction of the guide body 92, which on arrival at the right hand end of the part 24 of the frame takes up its horizontal position. After the stopping of the cross-bar 23, the length of the piece of tube corresponds to the distance between the guide body 92 and the cutting device 14. This may be adjusted as desired by longitudinal displacement of the cutting and welding device 14 along the part 1 of the frame, which during the operation retains its position. The tubular case is cut off from the stock of tube by operation of the device 14 and the end of the tubular case welded. After the front end of the tubular case is taken over by the guide body 92, the first pair 123 of clamps releases the tubular case.

To take over the tubular case, the guide body 92 is introduced into the open end of the tube. The tubular case is tensioned onto the guide body by operation of the work cylinder 145 for the displacement of the ring 135. The guide body then travels with the tube held by it over the conveyor plate 32 lying behind it and thereby takes up the roll of paper located therein, over which the tubular case is drawn. The roll of paper lifted by the guide body and standing up on its rear end, tilts as soon as more than half of it is located in the tube so that its other end then stands up. The stop 152 mounted on the rear end of the conveyor plate 32 prevents the roll of paper being displaced thereby beyond a given limit and determines its position in the conveyor plate 32 when the tubular case is drawn over it. The guide body 92 then travels beyond the stop 152 and releases the tubular case by operation of the work cylinder 145. Thereupon the stop 152 moves out of the case so that nothing prevents its forward movement.

In its left hand end position, the lower part of the stop member 142 rests on the inclined part of the spring 151. Thereby the guide body 92, on travelling to its right hand end position, is pivoted so that it can pass with its vertical axis at a distance above the traversing device and does not come into contact with a roll of paper lying thereon. By impact of the roller 141 on the adjustable stop member 150, the guide body is returned into a position wherein its axis lies horizontal (FIG. 1).

The rolls of paper are fed onto the traversing device 31 on the side remote from the welding device 67 in each case one roll being fed into one conveyor plate. Thereby spring 35 is pressed downwardly so that when the plate 32 travels into the slip-over position a switch is operated which indicates that a roll lies on the conveyor plate. This switch may be amplified by a welding switch at the welding position. The welding device is then only operated if a welding switch 154 arranged in front of it indicates that a tubular case to be closed lies in the conveyor plate located in front of the welding device.

The pair 79 of nozzles associated with the welding or closure device 67 is brought together to the narrowest possible distance apart and is now introduced into the end of the tubular case facing the device 67 in the longitudinal direction of the part 24 of the frame. The nozzles of the pair 79 are then removed apart such that the end of the tube is slightly tensioned, whereby, on subsequent welding folds can be avoided at the welded position. Subsequently the welding jaws 77 and the sealing jaws 78 of the closure device 67 lock and the flat nozzles of the pair 79 are tightly surrounded by the resilient coat on the sealing jaws. After the sealing of the tubular case, the latter is evacuated and subsequently the end of the tubular case adjacent the closure device 67 is welded. Thereafter the jaws of the closure device 67 open the pair of nozzles travel out of the tubular case and the ready packed roll of printing (or dyeline) paper may be conveyed further. A conveyor track, for example a belt conveyor, an inclined plane or the like may be disposed at the discharge station of the traversing device. The operation described above naturally requires a stepwise conveyance of the traversing device.

A longitudinally displaceable, spear-shaped opening body may be provided on the carriage for pair 79 of nozzles to open the tubular case, and whose movement depends on the movement of the pair of nozzles and ensures its engagement in the open tubular case. The movement of the opening body is in this case such that it runs ahead of the pair 79 of nozzles and is retracted when the latter is in its position of engagement. The opening body is guided by a bush and is moved by means of a lever engaging it with an elongated hole. The lever is pivoted by means of a leaf spring coupled to the pair of nozzles 79. The driving spring is lifted in the end position of the opening body, so that the pair of nozzles 79 can carry out a further movement, whilst the opening body is returned to its initial position by means of a return spring acting on its operating lever.

A switch is provided for the feed of the paper rolls which stops the traversing device 31 if no roll is laid therein. A switch for the movement of the reception head at the end of the track locks the movement of the traversing device if no tube is drawn onto an object and a switch is provided at the closure device 67 which locks the traversing device during welding.

The working cylinder may be driven by compressed air, suitable valves being employed, which may be controlled by electric switches. The device works in the manner described completely automatically. In order to avoid manual insertion of the objects a magazine may be provided at the side of the traversing device.

The described embodiment can carry out the simultaneous packing of two rolls of paper even though the packing of only one roll is described above. The packing of the other roll takes place in a similar manner.

What I claim is:

1. In a device for packing an object in a tubular case, the provision of a stock roller means for withdrawing a tube from said stock roller, means for cutting a predetermined length of tube from the tube drawn from the stock roller, first welding means for closing one end of the length of tube, conveyor means for moving the length of tube a distance corresponding to its length, opening means for opening said other end of the length of tube, means for slipping the length of tube over an object and second welding means for closing said other end of the length of tube.

2. The device of claim 1, in which the cutting means and the first welding means form a modular unit, said unit being adjustable in the direction of conveyance of the length of tube by the conveyor means, a light barrier being provided downstream of the first welding means.

3. The device of claim 2, in which the conveyor means comprises a longitudinally displaceable carriage and in which said opening means comprises clamping means mounted on the carriage and movable with respect to the carriage in a direction normal to the direction of displacement of the carriage.

4. The device of claim 3, in which the clamping means comprises a pair of clamps having arms pivotably mounted on the carriage, and a suction nozzle located on each arm, each suction nozzle being surrounded by a washer of resilient material.

5. The device of claim 4, and comprising a spring for urging the pair of clamps apart and a guide rail adapted to act indirectly on said pair of clamps whereby the suction nozzles can be moved towards and away from each other.

6. The device of claim 1, in which the means for slipping the length of tube over an object comprises a guide body, said guide body including a first ring, a plurality of double armed lamellae pivotably mounted on the ring, a spring for urging a first end of the lamellae towards each other so that the lamellae substantially define a cone shaped body, the apex of said cone shaped body being directed towards the cutting means and first welding means, a second ring surrounding said lamellae and displaceable with respect to the lamellae for altering the angle of the cone shaped body.

7. The device of claim 6, in which the guide body is pivotably adjustable between a first position and a second position, there being resilient means for holding the guide body in said first and second positions and means for urging said guide body upwardly.

8. The device of claim 7, in which the guide body is movable in the direction of conveyance of the length of tube, stop means being provided for limiting the travel of the guide body and for pivoting the guide body between said first and second positions.

9. The device of claim 1, wherein the means for slipping the length of tube on an object includes a traversing device, said traversing device comprises an endless conveyor having a plurality of conveyor plates arranged parallel to the direction of movement of said conveyor means and said endless conveyor being movable in a direction normal to the direction of movement of the conveyor means, a stop member being provided on the traversing device, said stop member being movable in the same direction as the direction of movement of the conveyor means.

10. The device of claim 9, in which the second welding means includes two jaws mounted so as to be movable towards and away from each other, a coating of resilient material being provided on the parts of the jaws adjacent each other and a pair of nozzles movable in the direction of movement of the conveyor means.

11. The device of claim 10, in which the opening means includes a spear-shaped body displaceable in front of said pair of nozzles and cooperable with said nozzles whereby the spear-shaped body is withdrawn from the length of tube before the nozzles are inserted therein.

References Cited

UNITED STATES PATENTS 2,847,806  8/1958  Wang _____ 53—183X

FOREIGN PATENTS 1,327,953  4/1963  France.
1,371,189  7/1964  France.

THERON E. CONDON, Primary Examiner

E. F. DESMOND, Assistant Examiner

U.S. Cl. X.R.

53—187